(12) United States Patent
Jana et al.

(10) Patent No.: US 6,172,155 B1
(45) Date of Patent: Jan. 9, 2001

(54) MULTI-LAYERED ARTICLE HAVING A CONDUCTIVE SURFACE AND A NON-CONDUCTIVE CORE AND PROCESS FOR MAKING THE SAME

(75) Inventors: Sadhan C. Jana, Copley; Avraam I. Isayev, Akron, both of OH (US)

(73) Assignee: The University of Akron, Akron, OH (US)

( * ) Notice: Under 35 U.S.C. 154(b), the term of this patent shall be extended for 0 days.

(21) Appl. No.: 09/198,736

(22) Filed: Nov. 24, 1998

(51) Int. Cl.$^7$ ........................................................ C08K 3/00
(52) U.S. Cl. ........................... 524/495; 524/439; 524/440; 524/441; 524/496
(58) Field of Search ..................................... 524/495, 496, 524/439, 440, 441

(56) References Cited

U.S. PATENT DOCUMENTS

| | | | |
|---|---|---|---|
| 4,076,788 | 2/1978 | Ditto | 264/255 |
| 5,348,067 | 9/1994 | Myatt | 152/152.1 |
| 5,518,055 | 5/1996 | Teeple et al. | 152/152.1 |
| 5,718,781 | * 2/1998 | Verthe et al. | 152/209 R |
| 5,743,973 | 4/1998 | Krishnan et al. | 152/152.1 |
| 5,898,047 | 4/1999 | Howald et al. | 152/209 R |

* cited by examiner

*Primary Examiner*—Edward J. Cain
(74) *Attorney, Agent, or Firm*—Renner, Kenner, Greive, Bobak, Taylor & Weber

(57) ABSTRACT

A multi-layered article includes a first nonconductive layer containing a base polymer and, optionally, a nonconductive filler, and a second conductive layer, set forth so as to be a surface of the article and containing a base polymer and a conductive material and, optionally, a nonconductive filler, wherein the base polymers have essentially the same molecular structure of repeating units and wherein the mechanical properties of the first and second layers are essentially the same. Method for the production of such a multi-layered article including the steps of forming the layers using injection molding, extrusion, or blow molding techniques are also provided.

18 Claims, 2 Drawing Sheets

MULTI-LAYERED ARTICLE HAVING A CONDUCTIVE SURFACE AND A NON-CONDUCTIVE CORE AND PROCESS FOR MAKING THE SAME

TECHNICAL FIELD

The present invention relates generally to a multi-layered article having at least one electrically conductive layer comprising a surface of the article and at least one non-conductive layer adjacent to the electrically conductive surface layer and forming at least a portion of the core of the article. More particularly, the present invention relates to a multi-layered article, as described above, wherein both the conductive and non-conductive layers are made from one or more polymers having the same molecular structure of repeating units. The layers may be prepared using a variety of conventional and non-conventional processing techniques, and are specifically useful in the production of green tires and in various spray painting applications.

BACKGROUND ART

The presence of electrically conductive surfaces on polymeric articles are required in many applications. For example, electrically conductive surfaces are oftentimes required for spray painting articles such as, but not limited to, vehicular body parts such as automobile body fenders, mirror housings, grills, and bumper fascias, as well as aircraft components and household products, such as refrigerators and other like appliances.

Electrically conductive surfaces may also be important in the production of tires. It is known that electrostatic charges are produced by the mechanical and electrical components operating within a motor vehicle. For example, a rotating shaft within a bearing can result in an electrostatic charge being generated within the vehicle. To dissipated this and other charges, electrically conductive rubber tires are employed on these vehicles. Were such dissipation not to occur, interference with electronic components within the motor vehicle would likely occur. Furthermore, static shock might be experienced by the vehicle's passengers as they board the vehicle. High electric charges have also led to safety hazards upon refueling of the vehicle. Accordingly, rubber tires have typically acted as an adequate conduit for the dissipation of such static charges produced from the mechanical or electrical components of a motor vehicle.

Presently, in order to provide electrically conductive surfaces to articles for various applications such as spray painting, the articles are manufactured entirely from conductive compounds of homopolymers or copolymers or blends thereof. The conductivity is achieved by the incorporation of conductive fillers, such as carbon fibers, carbon black particles, metal particles, etc., into the polymer from which the entire article will be formed using preferably conventional molding techniques. Unfortunately, many of these conductive compounds or polymers are very expensive. Therefore, the manufacturing of the article is very expensive.

Articles and products requiring electrically conductive surfaces are usually made by extrusion, compression or injection molding processes. However, some of these processes deleteriously affect the surface conductivity of the article or product.

For example, in the manufacture of articles via the injection molding process, a commonly utilized process for manufacturing these articles, high shear conditions oftentimes occur. These conditions, where the shear rate is typically between about 1000 and 10,000 l/sec., often lead to the migration and separation of the conductive particles, e.g., carbon black or metal particles, from the product surface. That is, when injection molding, the conductive particles within the polymer matrix used to form the article will often tend to be pushed or migrate away from the surface of the article. Thus, the surface of the article will tend to be rich in the polymer matrix and lean with respect to the conductive particles, while the core of the article will tend to be rich in the conductive particles and lean with respect to the polymer matrix.

Another problem with using conductive polymers throughout the entire molded product, besides the expensive cost of the polymers and problem of migration and segregation caused by high shear rate conditions, is that the conductive particles may reduce certain mechanical properties, such as tensile strength, in the article being manufactured. In some cases, it is desirable to maintain the high mechanical properties associated with certain homopolymers or blends thereof.

In tires, the problems with electrical conductivity has arisen due to the fact that tire manufacturers have begun to use less conductive materials, e.g., silica, within the tires which has, in turn, resulted in a decrease in the dissipation of static charge through such tires. Accordingly it is desirable to maintain the excellent advantages provided by the use of silica-filled tires, but yet adequately dissipate the static electricity which builds up in the motor vehicle.

Several patents have taught tires or tire treads having a thin conductive layer on the outermost portion of the tread. However, these tires processes add the conductive layer by spray coating or by production of an additional layer which does not include the advantageous filler. Thus, the filler is never a part of the conductive layer.

Thus, the need exists for a multi-layered article having at least one electrically conductive layer comprising a surface of the article and at least one non-conductive layer adjacent to the electrically conductive surface layer and forming the core, or at least another portion, of the article, both the conductive and non-conductive layers being made from the same or similar base polymer(s) and/or filler(s). In addition to the conductive material in the layer, the conductive layer can be filled with one or more non-conductive fillers, while the non-conductive layer can be filled with non-conductive filler(s). It is also desired to continue using well known processing techniques in the manufacture of these articles.

It will also be appreciated that production of articles having only the surface as a conductive layer may further be useful in solving problems associated with EMI shielding with conductive cores.

DISCLOSURE OF THE INVENTION

It is, therefore, an object of the present invention to provide a multi-layered article having an electrically conductive surface layer and a non-conductive core layer adjacent to the surface layer.

It is another object of the present invention to provide a multi-layered article, as above, wherein the conductive surface layer and the non-conductive core layer are made of one or more polymeric materials having the same molecular structure of repeating units.

It is still another object of the present invention to provide a multi-layered article which reduces the use of expensive conductive materials within the article requiring an electrically conductive surface, thereby reducing the cost of the article.

It is yet another object of the present invention to provide a multi-layered article having a conductive surface, as above, which maintains excellent mechanical properties as compared to articles employing non-conductive materials.

It is a further object of the present invention to provide a method for manufacturing an article having a conductive surface layer and a non-conductive core layer.

It is still a further object of the present invention to provide a method, as above, which does not employ high shear conditions and, therefore, does not force the migration or separation of the conductive materials away from the surface of the article.

It is yet a further object of the present invention to provide a method for manufacturing an article, as above, using conventional processing and molding techniques.

It is still another object of the present invention to provide a tire having a conductive surface layer including all of the ingredients of the core of the tire and further including a conductive material.

It is yet another object of the present invention to provide an article capable of being spray-painted and having a conductive surface layer including a conductive material.

These and other objects of the present invention, as well as the advantages thereof over existing prior art, which will become apparent from the description to follow, are accomplished by the improvements hereinafter described and claimed.

In general, the present invention provides an article having at least one surface, the article including at least one electrically conductive layer comprising at least one polymer and a conductive material, and forming the surface of the article; and at least one electrically non-conductive layer containing at least one polymer, disposed adjacent to one of the at least one conductive layers, and forming at least another portion of the article. The at least one conductive layer and the at least one non-conductive layer are made from one or more polymers having essentially the same molecular structure of repeating units, thereby providing for strong adhesion between the conductive layer and the non-conductive layer.

In accordance with another aspect of the present invention, a method for manufacturing a polymeric article having an electrically conductive surface layer containing an electrically conductive material and a polymer and an electrically non-conductive layer, containing a polymer having a molecular structure with the same repeating units as the polymer in the electrically conductive layer, disposed adjacent the conductive layer and bonded thereto is claimed. The method includes forming the non-conductive layer and separately forming the conductive surface layer and bonding the layers together by either compression molding or thermoforming the layers into the molded article.

In yet another aspect of the present invention, a method for manufacturing a polymeric article having an electrically conductive surface layer and an electrically non-conductive layer adjacent the conductive surface layer and bonded thereto is claimed. The method includes forming the conductive surface layer and the non-conductive layer by co-extruding the layers together.

In still another aspect of the present invention, a tire includes at least one electrically conductive layer comprising at least one polymer and a conductive material, and forming the tread surface of the tire; and at least one electrically non-conductive layer containing at least one polymer, disposed adjacent to one of said at least one conductive layers, and forming at least another portion of the tire. The at least one conductive layer and the at least one non-conductive layer are made from one or more polymers having essentially the same molecular structure of repeating units, thereby providing for strong adhesion between the conductive layer and the non-conductive layer.

Preferred exemplary embodiments and processes for making the same incorporating the concepts of the present invention is shown by way of example in the accompanying drawings without attempting to show all the various forms and modifications in which the invention might be embodied, the invention being measured by the claims and not by the details of the specification.

PREFERRED EMBODIMENT FOR CARRYING OUT THE INVENTION

The present invention is directed toward the production of multi-layered articles having at least one layer which is electrically conductive and which forms a surface of the article and at least a second layer, adjacent to the electrically conductive surface layer and forming at least a portion of the core of the article, which second layer is non-conductive, thereby eliminating much of the expensive conductive polymeric compound previously required to produce articles or products having electrically conductive surfaces. Notably, both the surface layer(s) and the core layer(s) of the article are made from the same or similar base polymers and, therefore, the layers are believed to readily and strongly adhere to each other due to easy diffusion of the polymer molecules from one layer to the other during manufacturing of the article using various processing techniques outlined hereinbelow.

It will be appreciated that the same or similar base polymers referred to herein are those polymers having essentially the same molecular structure of repeating units. It will be understood that the same polymers may be of different grades, have differing molecular weights, or terminate with different end functional groups, but that they are all the same polymer to the extent that the molecular structure of repeating units is the same.

Figure 1:
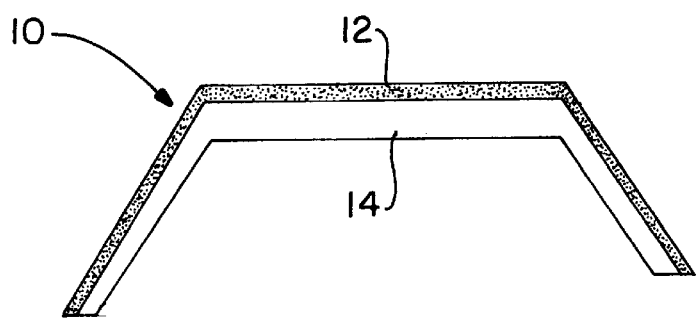
FIG. 1 is a side elevational view of a molded, multi-layered article prepared in accordance with the concepts of the present invention.

An article made in accordance with the present invention is indicated generally by the numeral 10 in FIG. 1 of the drawings. The article 10 includes a first layer 14 comprising an electrically non-conductive polymer, and a second layer 12 comprising the same or similar polymer and a material capable of rendering the second layer conductive.

The base polymer of the first and second layers 14 and 12 may be essentially any polymeric material known in the art. For instance, the polymer may be rubber or plastic, thermoplastic or thermoset, aliphatic or aromatic. The polymer may be a homopolymer or a blend of two or more homopolymers, a block, random or graft copolymer or terpolymer, or a thermosetting polymer.

The conductive layer requires the presence of a material suitable for rendering the base polymer conductive. Such materials include but are not limited to carbon fibers, carbon black particles, and metal particles. Preferably, carbon black particles are used.

Figure 5:
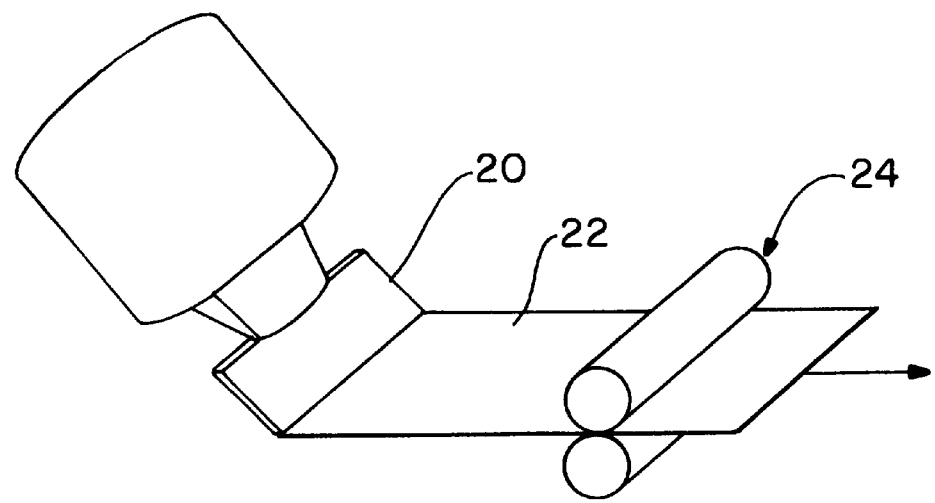
FIG. 5 is a perspective view of a film extrusion apparatus extruding a film suitable for use as the conductive surface layer or the non-conductive core layer of a polymeric article.

There are numerous known processing methods available for the production of the articles of the present invention. In accordance with a first embodiment of the present invention, the production of the multi-layered article can be accomplished by making separate films of conductive and non-conductive material using conventional extrusion techniques. As generally shown in FIG. 5, a non-conductive polymer can be extruded through a typical film die 20 to provide a film 22. The film 22 is then typically passed through a roller assembly 24 or similar calendering apparatus as is known in the art to produce the respective non-conductive extruded sheet. In the same way, a conductive polymer, i.e., the base polymer and a conductive material blended therein, can be extruded through a different film die 20 and passed through the roller assembly 24 to provide a separate film like 22. The conductive extruded film and the non-conductive extruded film can then be cut and compression molded or thermoformed into multi-layered articles as is known in the art.

Figure 6:
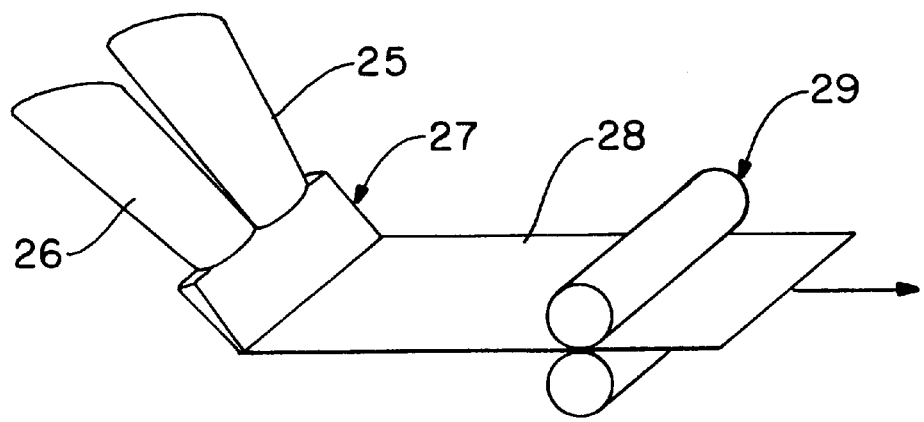
FIG. 6 is a perspective view of a film co-extrusion apparatus co-extruding a film suitable for use as the conductive and nonconductive layers of a polymeric article.

In a similar, second embodiment, the non-conductive core layer and the conductive surface layer can be co-extruded into a sheet or film through a specially-designed die as is well known in the art. Thus, with reference to FIG. 6, the layers are coextruded from ports 25 and 26 of the apparatus 27 and adhered to each other so as to form a multi-layered polymeric sheet or film 28 passed through roller assembly 29. Typically, once the co-extruded films are formed and passed through the rollers 29, they are then cut to a particular length or in a particular pattern suitable for further production of the article. The prepared multi-layered co-extruded sheets can then be thermoformed or compression molded as is well known in the art to the shape of the article desired.

Thus, in the first two embodiments, the conductive and non-conductive layers can be extruded separately and adhered together upon compression molding or thermoforming of the final product, or can be coextruded during a co-extrusion process or stage, followed by compression molding or thermoforming to form the multi-layered polymer sheets.

As a third process embodiment for the manufacture of a multi-layered article having a conductive surface layer and a non-conductive core layer, the conductive surface layer can be prepared according to the same procedure of extrusion as set forth in the first embodiment hereinabove. However, a preform of the non-conductive core layer is molded to the required shape of the final product, according to conventional practice, using conventional injection molding techniques.

Subsequently, the conductive extruded film may be placed in the mold on the surface of the preform and compression molded onto the surface of the preform. The heat of the compression molding process will promote adherence of the conductive extruded film to the injection molded preform of the non-conductive core layer since the base polymers of the film and the mold are essentially the same, i.e., have the same molecular structure of repeating units.

In a fourth embodiment, the article can be manufactured using the injection molding process detailed hereinabove for the non-conductive molded preform of the core layer, and subsequently, opening the mold to allow at least partial filling of the space created by injection of the conductive compound, followed by squeezing of the conductive compound to fill the space and compression molding of the injected conductive compound to the core preform.

Figure 2:
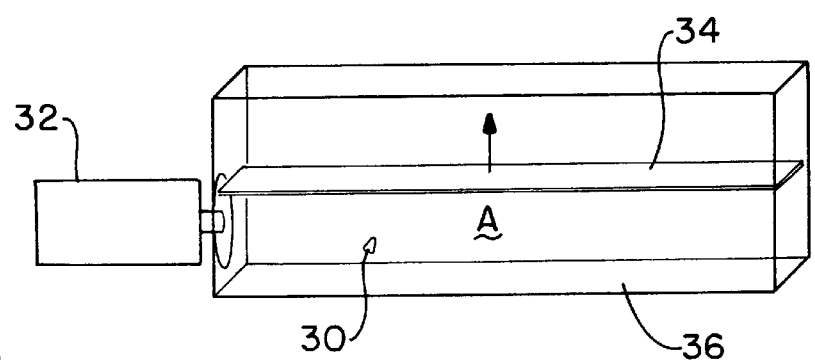
FIG. 2 is a perspective view of a molding apparatus showing the injection of a non-conductive polymer A (clear) into a portion of the molding apparatus.
Figure 3:
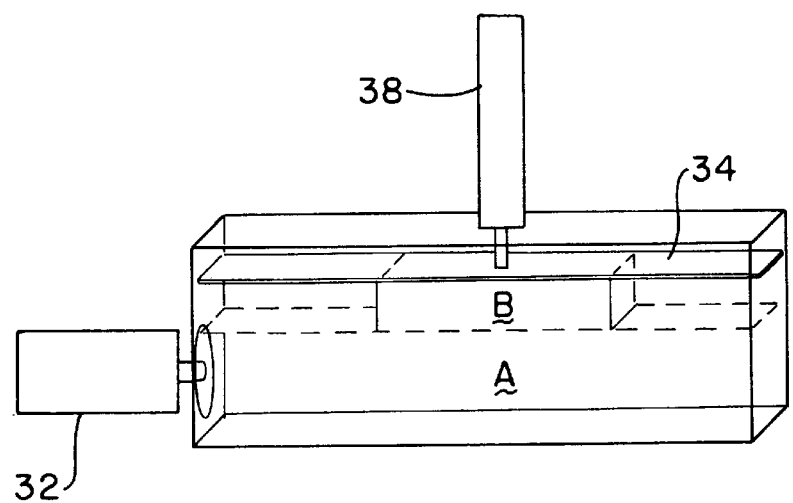
FIG. 3 is a perspective view of the molding apparatus of FIG. 2 showing the mold having been opened and a conductive polymer B (black) having been injected into the opening between the moved side of the mold and the polymer A.
Figure 4:
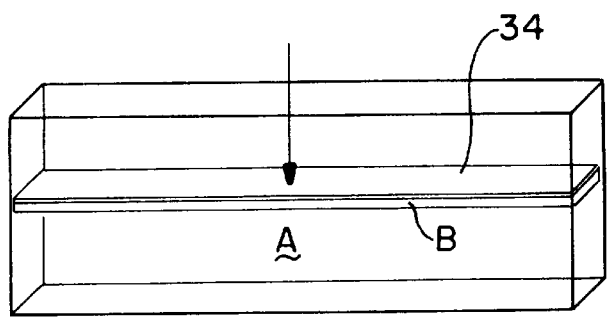
FIG. 4 is a perspective view of the molding apparatus of FIG. 2 showing the conductive polymer B being compression molded against non-conductive polymer A.

With respect to FIGS. 2–4, it will be appreciated that a first non-conductive polymer (polymer A) may be injected into a mold cavity formed between nesting, separable dies 34,36 of a matched metal die mold set. That is, the polymeric, molded core preform (shown as polymer A in FIGS. 2–4) of the article is injection molded in a mold cavity 30 by way of an injection device 32. In FIGS. 2 and 3, one of the dies 34 is opened and the core preform is allowed to set-up (i.e., harden as by curing or solidifying) sufficiently to retain its shape. In this regard, thermosets need not be fully cured at this stage in the operation and final curing of the non-conductive core can be accomplished coincidentally with the curing of the conductive surface layer.

When the core preform is sufficiently set-up to permit opening of the mold without deleteriously affecting the molded part, the ram pressure on the movable die is reduced, and the conductive polymer resin is injected between the surface-forming die and the core surface so as to hydraulically hold the core substantially immobile against the other cooperating member of the die set during opening. Preferably, the surface-forming polymer resin is injected against and substantially normal to the surface being coated to achieve maximum immobilization of the substrate especially near the injector. Preferably, the conductive polymer is injected at a rate slow enough to prevent migration or segregation of the conductive material from the base polymer due to the high shear rate oftentimes found during injection molding processes. That is, the shear rate should be below the critical shear rate for the given polymer and conductive filler system to avoid migration or segregation of the conductive filler. Preferably, such a shear rate is typically on the order of about 10 to about 100 1/sec.

As shown in FIG. 3, the conductive polymer is also preferably only partially injected in the space created by the opening of the mold die 34 by way of a second injection device 38 essentially perpendicular to the first injection device 32, although filling the entirety of the space is not outside the scope of the present invention. By only partially filling the mold, the compression molding of the conductive polymer (polymer B) to the non-conductive polymer (polymer A) will be more easily rendered. Also, the potential for high shear forces will be minimized.

In other words, by the end of injection, the surface forming die is separated from the core surface being coated by a gap which exceeds the ultimate thickness of the finished surface layer. In this regard, the size of the gap will depend upon the thickness of the surface layer, and thickness of this layer will depend upon the application, i.e., spray-coating, or use, i.e., as a tire, of the article being manufactured. In any event, the amount of injected conductive polymer should be enough to cover the entire surface of the non-conductive layer to a preselected thickness. In this regard, the dies separate sufficiently to receive all of the injected conductive polymer resin and distribute it preferably over about 50% of the non-conductive core surface to be coated. The degree of conductive polymer resin distribution during injection can vary significantly depending primarily on the viscosity of the injected conductive material. In this regard, low viscosity materials are more readily distributed over larger areas with lower injection pressures than high viscosity materials. This may be at least partially controlled by controlling the concentration of the conductive filler in the conductive layer. Maintenance of a seal during opening prevents loss of the skin-forming polymer from around the edges of the mold cavity, helps direct the flow of the surface layer-forming resin across the core surface being coated during injection and causes a slight vacuum to be formed in the gap which facilitates the injection without the need for positively venting the mold cavity.

Following injection of the requisite predetermined amount of conductive polymer forming the surface layer, the ram(s) or die(s) is repressurized, and the conductive polymer forming the surface layer is spread over the remainder of the surface of the non-conductive core by compression forces as shown in FIG. 4. With knowledge of the surface area to be covered the amount of polymer resin injected is predetermined to provide a surface layer of predetermined thickness. Thereafter, the temperature and pressure are maintained until the conductive surface layer sets-up sufficiently to permit opening of the dies and ejection of the article having a conductive surface layer and non-conductive core layer. During this time the core layer itself may finish curing in the event injection occurred before it had completely cured. In general, it has been observed that injection may begin after the substrate has cured about 90% without deleteriously affecting the outcome.

It will further be appreciated that, by use of a third injection device opposite the second injection device and again normal to the angle of the first injection device, a second conductive surface layer may be molded to the opposite surface of the core layer, thus presenting an article having at least two surfaces made of conductive polymer resin and a non-conductive core.

A fifth process embodiment can be accomplished through extruding multi-layer parison with the internal and/or external surface being conductive and the core layer being non-conductive as set forth substantially in either of the first two embodiments hereinabove. Thus, the multi-layered parison can then be blow molded into hollow products with conductive surface.

Thus, it should be evident that an article prepared in accordance with the present invention will effectively reduce the amount of conductive polymer currently used in the production of articles requiring conductive surfaces for various applications. In turn, because the amount of conductive polymer is reduced and replaced with non-conductive polymer of the same or similar molecular structure, the mechanical properties of the resultant article are believed to be essentially the same as if the article was produced with non-conductive polymers. Moreover, problems of migration and segregation of the conductive materials with the polymer matrix appear to have been mitigated.

The foregoing processes are particularly suitable for use in the manufacture of tires, and particularly, silica-filled tire compositions. Silica is not an electrically conductive filler, unlike carbon black. Thus, construction of a tire having a surface layer prepared in accordance with the present invention and including silica, carbon black and a rubber elastomer, along with the rest of the tire composition including silica and the same or similar rubber elastomer (i.e., the core layer) is believed particularly desirable.

Similarly, articles requiring spray-coating wherein the coating is to be conductively adhered to the article can also be produced.

Based upon the foregoing disclosure, it should now be apparent that the article and methods described herein will carry out the objects set forth hereinabove. It is, therefore, to be understood that any variations evident fall within the scope of the claimed invention and, thus, the selection of specific component elements can be determined without departing from the spirit of the invention herein disclosed and described.

What is claimed is:

1. An article having at least one surface, the article comprising:
   at least one electrically conductive layer comprising at least one polymer and a conductive material, and forming the surface of the article; and
   at least one electrically non-conductive layer containing at least one polymer, disposed adjacent to one of said at least one conductive layers, and forming at least another portion of the article,
   wherein each of said at least one polymer in said at least one conductive layer has essentially the same molecular structure of repeating units as a corresponding polymer in said at least one non-conductive layer and each of said at least one polymer in said at least one non-conductive layer has essentially the same molecular structure of repeating units as a corresponding polymer in said at least one conductive layer, thereby providing for strong adhesion between said conductive layer and said non-conductive layer.

2. The article according to claim 1, wherein said at least one polymer in said at least one conductive layer and said at least one polymer in said non-conductive layer is selected from the group consisting of homopolymers, blends of two or more homopolymers, block and random copolymers and terpolymers, and thermosetting polymers.

3. The article according to claim 1, wherein said conductive material is selected from the group consisting of carbon fibers, carbon black particles, and metal particles.

4. A method for manufacturing a polymeric molded article having an electrically conductive surface layer containing an electrically conductive material and at least one polymer; and an electrically non-conductive layer containing at least one polymer, wherein each of the at least one polymer in the electrically non-conductive layer has a molecular structure with the same repeating units as a corresponding polymer in the electrically conductive surface layer, and each of the at least one polymer in the electrically conductive surface layer has a molecular structure with the same repeating units as a corresponding polymer in the electrically non-conductive layer, the electrically non-conductive layer being disposed adjacent to the electrically conductive surface layer and bonded thereto, the method comprising:
   forming the electrically non-conductive layer and separately forming the electrically conductive surface layer; and
   bonding the layers together by either compression molding or thermoforming the layers into the molded article.

5. The method according to claim 4, wherein said at least one polymer in said electrically conductive surface layer and said at least one polymer in said electrically non-conductive layer is selected from the group consisting of homopolymers, blends of two or more homopolymers, block and random copolymers and terpolymers, and thermosetting polymers.

6. The method according to claim 4, wherein said conductive material is selected from the group consisting of carbon fibers, carbon black particles, and metal particles.

7. The method according to claim 4, wherein said conductive layer and said nonconductive layer are separately formed using extrusion techniques prior to being bonded together.

8. The method according to claim 4, wherein said conductive layer and said nonconductive layer are formed within one mold cavity using injection molding techniques prior to being bonded together.

9. The method according to claim 8, wherein the step of forming the conductive layer and the non-conductive layer includes the steps of injecting the at least one polymer of the non-conductive layer into the mold cavity to form a molded preform; opening the mold to create a space; and at least partially filling the space by injecting the conductive material and the at least one polymer of the conductive layer into the space.

10. The method according to claim 9, wherein the step of injecting the conductive material and the at least one polymer of the conductive layer further includes squeezing the conductive layer to fill the mold cavity.

11. The method according to claim 9, wherein the conductive material and the at least one polymer of the conductive layer are injected at a shear rate below the critical shear rate of the conductive material and the at least one polymer, and sufficiently slow to prevent migration and segregation of the conductive material from the at least one polymer.

12. The method according to claim 9, wherein the conductive material and the at least one polymer of the conductive layer are injected into the space to fill about 50 percent of the space.

13. A method for manufacturing a polymeric molded article having an electrically conductive surface layer and an electrically non-conductive layer adjacent to the conductive surface layer and bonded thereto, the method comprising forming the conductive surface layer and the non-conductive layer by co-extruding the layers together and injection molding the layers into the molded article.

14. The method according to claim 13, further comprising the step of compression molding the layers into the molded article.

15. The method according to claim 13, further comprising the step of thermoforming the layers into the molded article.

16. A tire comprising:
   at least one electrically conductive layer comprising at least one polymer and a conductive material, and forming the tread surface of the tire; and
   at least one electrically non-conductive layer containing at least one polymer, disposed adjacent to one of said at least one conductive layer, and forming at least another portion of the tire,
   wherein each of said at least one polymer in said at least one conductive layer has essentially the same molecular structure of repeating units as a corresponding polymer in said at least one non-conductive layer and each of said at least one polymer in said at least one non-conductive layer has essentially the same molecular structure of repeating units as a corresponding polymer in said at least one conductive layer, thereby providing for strong adhesion between said conductive layer and said non-conductive layer.

17. The tire according to claim 16, wherein said at least one polymer in said at least one conductive layer and said at least one polymer in said non-conductive layer is selected from the group consisting of homopolymers, blends of two or more homopolymers, block and random copolymers and terpolymers, and thermosetting polymers.

18. The tire according to claim 16, wherein said conductive material is selected from the group consisting of carbon fibers, carbon black particles, and metal particles.

* * * * *